(12) United States Patent
Chen et al.

(10) Patent No.: US 7,448,777 B2
(45) Date of Patent: Nov. 11, 2008

(54) LIGHT SOURCE MODULE AND PROJECTION DISPLAY HAVING THE SAME

(75) Inventors: Ying-Chieh Chen, Chu-Nan (TW); Wei-Cheng Lo, Chu-Nan (TW); Nien-Hui Hsu, Chu-Nan (TW)

(73) Assignee: Coretronic Corporation, Hsinchu (TW)

( * ) Notice: Subject to any disclaimer, the term of this patent is extended or adjusted under 35 U.S.C. 154(b) by 55 days.

(21) Appl. No.: 11/441,940

(22) Filed: May 25, 2006

(65) Prior Publication Data

US 2006/0285337 A1 Dec. 21, 2006

(30) Foreign Application Priority Data

Jun. 21, 2005 (TW) .............................. 94120554 A

(51) Int. Cl.
*B60Q 1/06* (2006.01)
(52) U.S. Cl. ........................ 362/373; 362/294; 362/345; 353/58; 353/60; 353/61
(58) Field of Classification Search ................. 362/373, 362/294, 345; 353/61, 58, 60
See application file for complete search history.

(56) References Cited

U.S. PATENT DOCUMENTS 3,703,635 A * 11/1972 Burkarth ..................... 362/300
7,140,734 B2 * 11/2006 Lim ............................. 353/61
2003/0179579 A1 * 9/2003 Hsu et al. .................... 362/294

* cited by examiner

*Primary Examiner*—Stephen F Husar
*Assistant Examiner*—Jessica L McMillan
(74) *Attorney, Agent, or Firm*—J.C. Patents

(57) ABSTRACT

A light source module comprises a case, a light source, a first air-circulation device, a second air-circulation device and an airflow guide. The case has an airflow outlet, and other components are disposed therein. The airflow guider includes a first stream-guiding part and a second stream-guiding part connected thereto. The first stream-guiding part and the airflow outlet are at a same side of the light source, the second stream-guiding part is over the light source. The first airflow provided by the first air-circulation device passes past the light source, arrives at the first stream-guiding part, flows from the front of the light source towards the back of the light source guided by the second stream-guiding part, and mixes up with the second airflow provided by the second air-circulation device and finally exits from the airflow outlet. Therefore, concentrated heat is prevented at the airflow outlet.

12 Claims, 3 Drawing Sheets

LIGHT SOURCE MODULE AND PROJECTION DISPLAY HAVING THE SAME

CROSS-REFERENCE TO RELATED APPLICATION

This application claims the priority benefit of Taiwan application serial no. 94120554, filed on Jun. 21, 2005. All disclosure of the Taiwan application is incorporated herein by reference.

BACKGROUND OF THE INVENTION

1. Field of Invention

The present invention relates to a light source module and a projection display having the light source module, and particularly to a light source module equipped with cooling fans and a projection display having the light source module.

2. Description of the Related Art

With the progress of optical projection technology in the modern society, projection displays with high-definition, high-resolution and large projection frame size have been widely developed and applied. To obtain projection frames with high-brightness, a high-powered light source is needed in a projection display. Such high-powered light source would generate much heat during the operation. To have a longer lifetime and a good display quality, the projection display needs a proper heat-dissipation design.

FIG. 1 is a schematic top view of a conventional projection display showing a part near a light bulb. Referring to FIG. 1, the light bulb 100 is disposed inside a case 110 of the projection display and near an air outlet 112 set on the case 110. A blower 120 and an axial fan 130 are disposed beside the light bulb 100. The blower 120 blows an airflow 122 from the outside of the light bulb 100 towards the inside of the light bulb 100. Then the airflow 122 flows out of the light bulb 100 and to a side of the light bulb 100 near the air outlet 112 with the guide of an airflow guider 140. Along the route the airflow 122 passing, heat inside the light bulb 100 is brought out. The axial fan 130 is disposed at another side of the light bulb 100 opposite to the air outlet 112 and blows another airflow 132 towards the periphery of the light bulb 100 meanwhile. As the airflow 122 arrives to region A beside the air outlet 112, it would immediately exit from the air outlet 112 with the interference of the airflow 132.

Since the temperature inside the light bulb 100 is far higher than the temperature outside the light bulb 100, the airflow 122 is accordingly hotter than the airflow 132. In the above-described conventional design, it can be seen, however, that once the airflow 122 leaves the airflow guider 140, it is immediately expelled from the air outlet 112 beside the region A by a force of the airflow 132. Therefore the airflow 122 has no chance to sufficiently mix with the low-temperature airflow 132. This phenomenon results in concentrated heat at the air outlet 112 beside the region A. In some cases, the concentrated high-temperature can even reach 102° C., which not only fails the safety requirement, but also becomes a safety hazard to users. Therefore, a light source of projection display with an effective, better heat-dissipation design has come to the forefront in the projection display technology.

SUMMARY OF THE INVENTION

An object of the present invention is to provide a light source module capable of preventing the air outlet from concentrated heat.

Another object of the present invention is to provide a projection display having the above-mentioned light source module capable of preventing the air outlet from concentrated heat.

The present invention provides a light source module, which includes a case, a light source, a first air-circulation device, a second air-circulation device and an airflow guider. The case has an airflow outlet thereon. The light source is disposed in the case. The first air-circulation device is disposed in the case and blows a first airflow towards the light source. The first circulation and the airflow outlet are located at opposite two sides of the light source. The second air-circulation device is disposed in the case and blows a second airflow towards the light source. The second air-circulation device and the first air-circulation device are located at a same side of the light source. The airflow guider is deposed in the case and comprises a first stream-guiding part and a second stream-guiding part connected to the first stream-guiding part. The first stream-guiding part and the airflow outlet are located at a same side of the light source, and the second stream-guiding part is located over the light source. The first airflow passes through the light source and flows towards the first stream-guiding part, then 20 flows from a front of the light source towards a back of the light source guided by the second stream-guiding part, and the first airflow mixes up with the second airflow and finally exits from the airflow outlet. The present invention also provides a projection display having the above-mentioned light source module.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve for explaining the principles of the invention.

DESCRIPTION OF THE EMBODIMENTS

Figure 2:
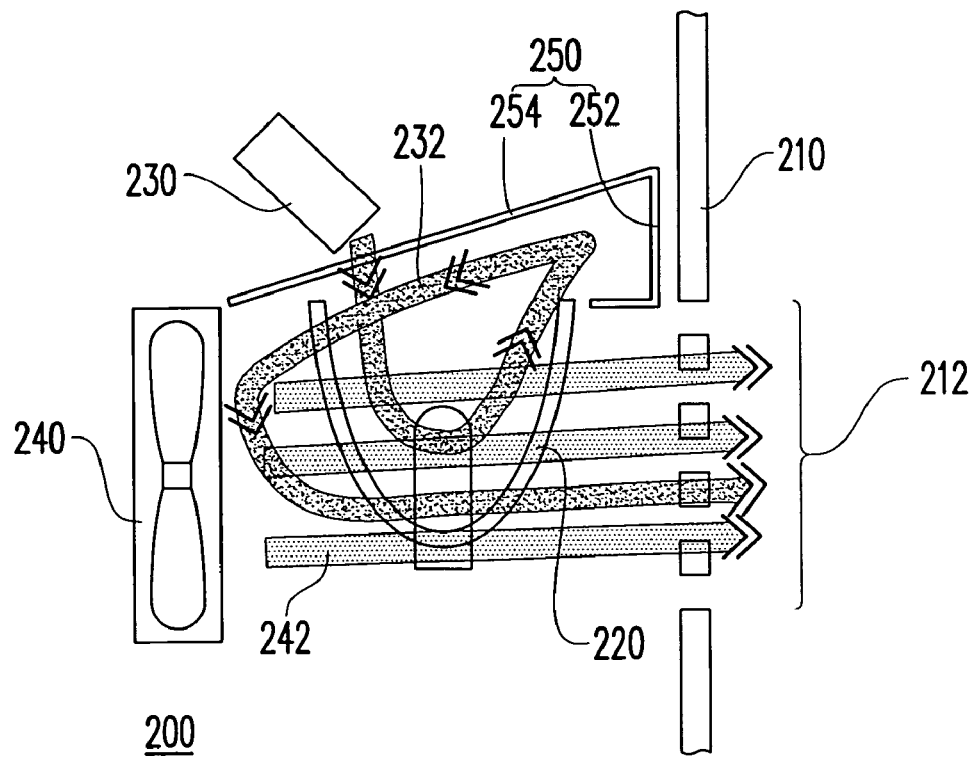
FIG. 2 is a schematic top cross-sectional view of a light source module in an embodiment of the present invention.
Figure 3:
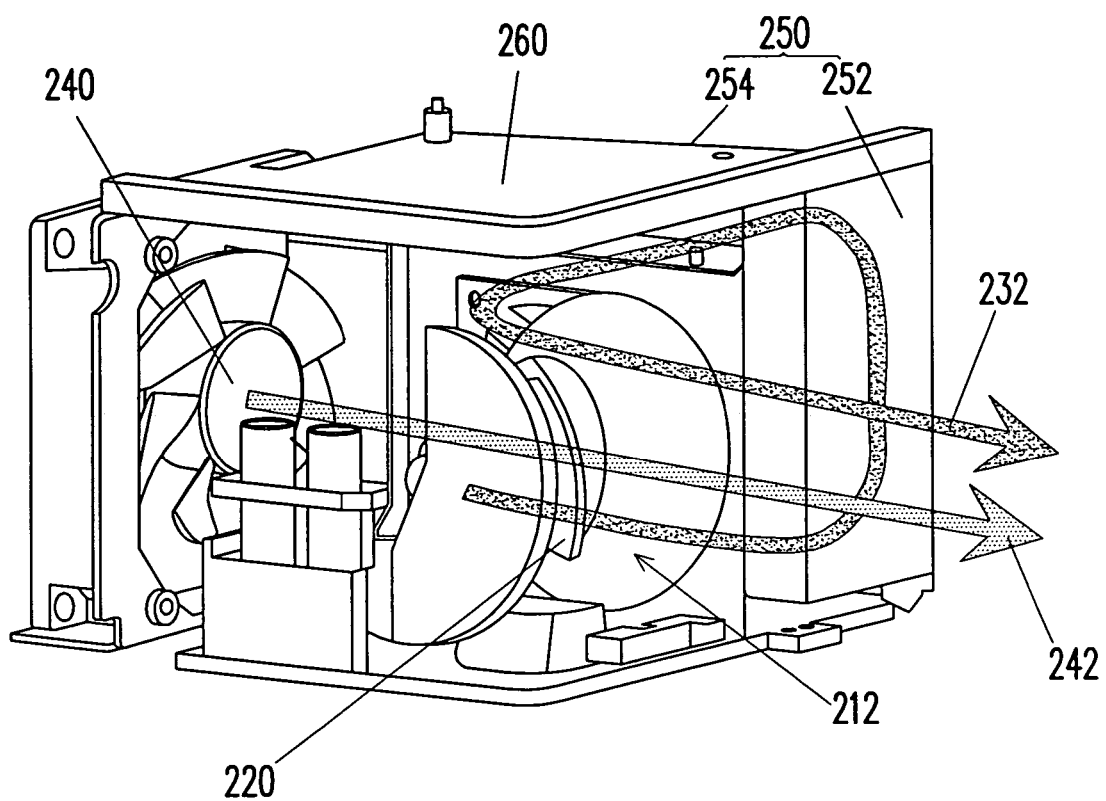
FIG. 3 is a perspective view of the light source module in FIG. 2 without a case.
Figure 4:
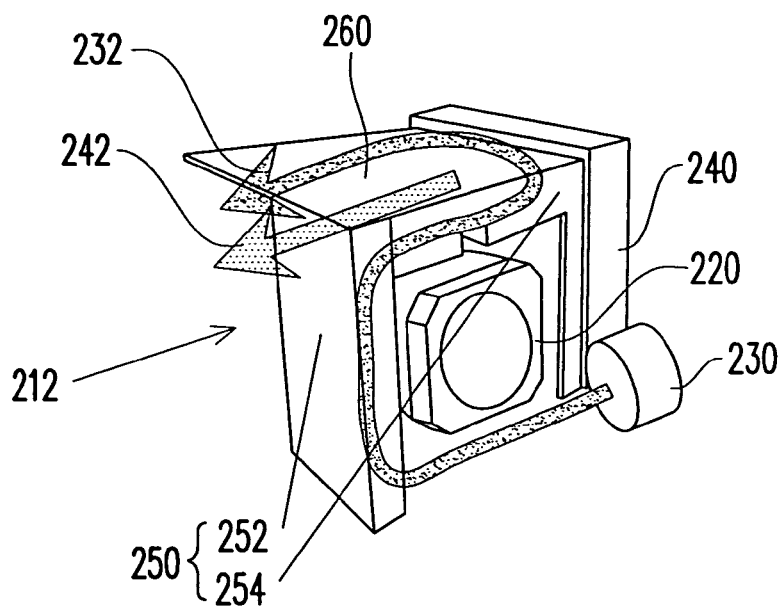
FIG. 4 is a perspective view of the light source module in FIG. 2 without a case from another angle.

Referring to FIG. 2, a light source module 200 of the present invention includes a case 210 (only a portion is shown in FIG. 2), a light source 220, a first air-circulation device 230, a second air-circulation device 240 and an airflow guider 250. The light source module 200 of this embodiment can be used as an independent light source device or used in other equipments where a light source is required. When the light source module 200 is used in other equipments, the case 210 of the light source module 200 can be replaced by the case of the equipment. The case 210 has an airflow outlet 212 used for heat dissipation. With reference to FIGS. 3 and 4, where case 210 is not shown, the locations of the airflow outlet 212 are at the right side in FIG. 3 and the left side in FIG. 4, respectively. The light source 220, the first air-circulation device 230, the second air-circulation device 240 and the airflow guider 250 are disposed inside the case 210. The light source 220 can be a light bulb, an LED or other appropriate light sources capable of providing high-luminance light beam.

The first air-circulation device 230 and the airflow outlet 212 are located at opposite two sides of the light source 220, respectively. Taking FIG. 2 for example, the first air-circulation device 230 and the airflow outlet 212 are located at the left side and the right side, respectively. The first air-circulation device 230 is used for blowing a first airflow 232 towards the light source 220. Specifically, the first air-circulation device 230 can be disposed in front of the light source 220, so that the first airflow 232 can be blown from the front of the light source 220 towards the inside of the light source 220, which can obtain a best cooling effect in the inside of the light source 220. In this embodiment, the first air-circulation device 230 is a blower. Nevertheless, other types of fans are also available. The second air-circulation device 240 and the first air-circulation device 230 are located at the same side of the light source 220, and the second air-circulation device 240 is used for blowing a second airflow 242 towards the light source 220. In this embodiment, the second air-circulation device 240 can be an axial fan and be disposed at a side of the light source 220, so that the second airflow 242 is blown towards the periphery of the light source 220 for dissipating heat.

The airflow guider 250 includes a first stream-guiding part 252 and a second stream-guiding part 254 connected to the first stream-guiding part 252. The first stream-guiding part 252 and the airflow outlet 212 are located at the same side of the light source 220, while the second stream-guiding part 254 is located over the light source 220. Preferably, the first stream-guiding part 252 can be disposed in front of the light source 220. And the first stream-guiding 252 and the first air-circulation device 230 are at the opposite two sides of the light source 220.

Referring to FIG. 2, the first airflow 232 blown by the first air-circulation device 230 runs along the inside of the light source 220 to take away heat, which elevates the temperature of itself. Then the first air-circulation device 230 flows towards the first stream-guiding part 252. After arriving at the first stream-guiding part 252, the first airflow 232 is stopped and flow along the second stream-guiding part 254, which prevents the first airflow 232 from being immediately expelled from the airflow outlet 212. Then, the second stream-guiding part 254 guides the first airflow 232 to flow from the front of the light source 220 to the back of the light source 220. And preferably, the flowing direction of the first airflow 232 is to be away frown the airflow outlet 21 2. At the back of the light source 220, the high-temperature first airflow 232 and the low-temperature second airflow 242 sufficiently mix up with each other, and expel from the airflow outlet 212 together with a moderate temperature.

According to the above description, the stream route of the first airflow 232 in the light source module 200 of the present invention is extended by installing an airflow guider 250. Therefore the high-temperature airflow, in this embodiment the first airflow 232, can be gradually cooled. Specifically, the second stream-guiding part 254 of the airflow guider 250 guides the high-temperature first airflow 232 to the back of the light source. And the first airflow 232 mixes up with the second airflow 242 for moderately cooling the first airflow 232, before being expelled from the airflow outlet 212. In this way, the concentrated high temperature appeared at the airflow outlet 212 in the conventional light source module can be solved. Furthermore, the light source module 200 of the present invention can meet the safety requirement, and prevent from burning the users of the light source module 200.

Figure 1:
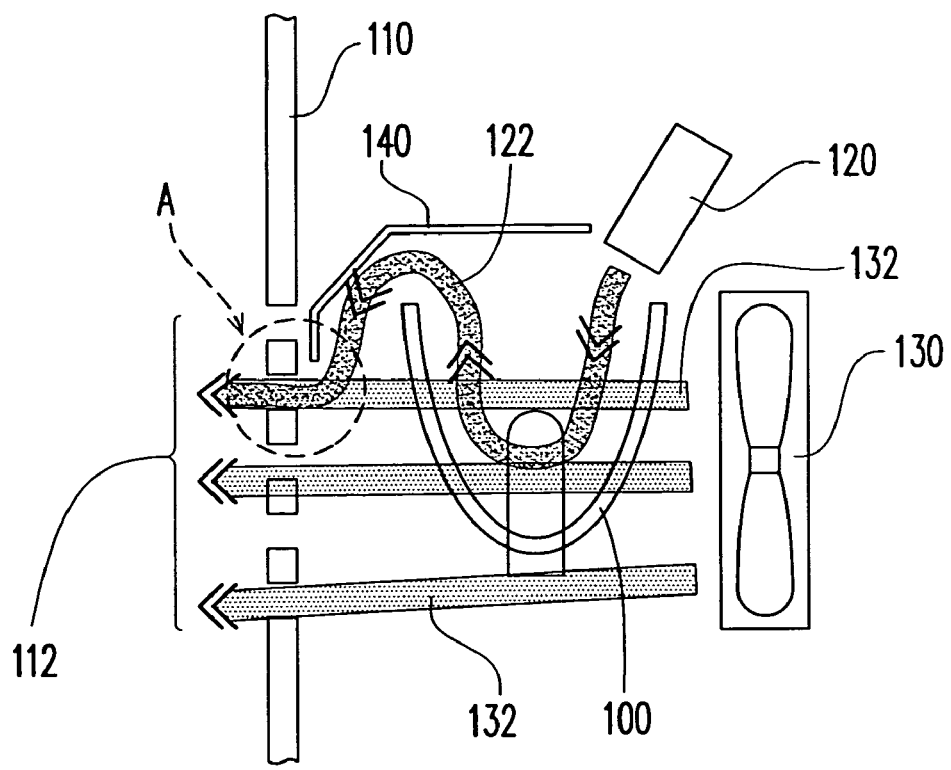
FIG. 1 is a schematic top view of a conventional projection display showing a part near a light bulb.

Take a light source of 200 W power as an example. The temperature at the airflow outlet can reach 51° C.~102° C. in a conventional light source module of FIG. 1, while 51° C.~83° C. according to the design of the present invention.

Referring to FIG. 2, in this embodiment, the first air-circulation device 230 that generates the first flow 232 is above the light source 220 and between the light source 220 and the case 210. It is certainly that the first air-circulation device can also be located under the light source 220 or at a side away from the airflow outlet 212. In the light source module 200, a heat-isolation plate 260 (referring to FIGS. 3 and 4) can be further disposed inside the case 210 and over the light source 220. In more detail, the heat-isolation plate 260 is between the case 210 and the light source 220 to avoid overheat at the portion of the case 210 over the light source 220 while the first airflow 232 is flowing towards the back of the light source 220. Furthermore, the heat-isolation plate 260 and the airflow guider 250 can be integrally formed, and they can both be made of metal or other appropriate materials.

Figure 5:
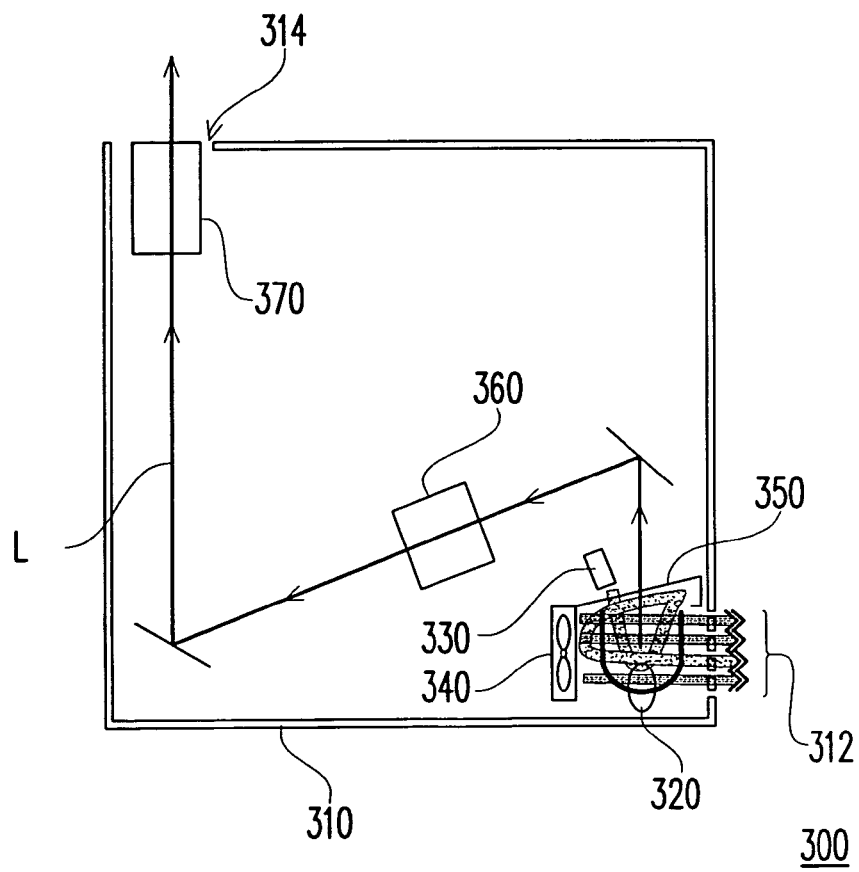
FIG. 5 is a schematic top cross-sectional view illustrating an embodiment of a projection display according to the present invention.

FIG. 5 is a schematic top cross-sectional view illustrating an embodiment of a projection display according to the present invention. Referring to FIG. 5, the projection display 300 includes a case 310, a light source 320, an imaging unit 360, a projection lens 370, a first air-circulation device 330, a second air-circulation device 340 and an airflow guider 350. The light source 320, the first air-circulation device 330, the second air-circulation device 340 and the airflow guider 350 in this embodiment are similar to those in FIG. 2, therefore the detailed descriptions are omitted herein. It is noted that the case 310 has an airflow outlet 312 and a projection opening 314, and the imaging unit 360 and the projection lens 370 are disposed inside the case 310. The light source 320 is used for producing light beam L, and the projection lens 370 is located at the projection opening 314. The light beam L provided by the light source 320 travels through the imaging unit 360 and the projection lens 370, and is then projected outwards from the projection opening 314 to a screen for displaying images.

In the projection display 300, there is also the advantage of no concentrated heat at the airflow outlet 312. The projection display can meet the safety requirements, and prevent from burning the users of the projection display 300.

In addition, the imaging unit 360 can be a penetrated-type LCD panel, a reflective-type LCOS (liquid crystal on silicon) panel, a DMD (digital micromirror device) or other imaging units. Moreover, the projection display 300 can be added with a heat-isolation plate 260 as shown in FIG. 3. For simplicity, the heat-isolation plate is not shown in FIG. 5 and the description is omitted herein.

From the above description, according to the present invention, the light source module and the projection display having the same has an airflow guider which guides the hotter airflow to the back of the light source installed therein, which prevents the hotter airflow from being expelled from the airflow outlet immediately after running past the light source. Instead, the airflow guider guides the hotter airflow to the back of the light source for mixing with the cool airflow, which makes the temperature of the two airflows being moderate, before being expelled from the airflow outlet. In this way, the high-temperature airflow would not exit directly at the airflow outlet and not make a part of the light source module and the projection display having the same being concentrated high-temperature. Therefore, the light source module and the projection display having the same according to the present invention can meet the safety requirements, and prevent from burning the users.

It will be apparent to those skilled in the art that various modifications and variations can be made to the structure of the present invention without departing from the scope or spirit of the invention. In view of the foregoing, it is intended that the specification and examples to be considered as exemplary only, with a true scope and spirit of the invention being indicated by the following claims and their equivalents.

What is claimed is:

1. A light source module, comprising:

a case having an airflow outlet thereon;

a light source disposed in the case;

a first air-circulation device disposed in the case, the first air-circulation device and the airflow outlet being located at opposite two sides of the light source, wherein the first air-circulation device is located at the front of the light source and blows a first airflow towards the inside of the light source;

a second air-circulation device disposed in the case, the second air-circulation device and the first air-circulation device being located at a same side of the light source, wherein the second air-circulation device is located at a side of the light source and blows a second airflow towards the periphery of the light source; and an airflow guider disposed in the case, comprising a first stream-guiding part and a second stream-guiding part connected to said first stream-guiding part, the first stream-guiding part and the airflow outlet being located at a same side of the light source, the second stream-guiding part being over the light source, wherein the first airflow blown into the inside of the light source leaves the inside of the light source at the front of the light source and then flows towards the first stream-guiding part, and then the first airflow is guided by the second stream-guiding part to flow from the front of the light source towards the second air-circulation device, such that the first airflow with a first temperature mixes up with the second airflow with a second temperature, wherein the first temperature is higher than the second temperature, and the first airflow and the second airflow finally exit from the airflow outlet with a moderate temperature.

2. The light source module as recited in claim 1, wherein the first air-circulation device is a blower and the second air-circulation device is an axial fan.

3. The light source module as recited in claim 1, further comprising a heat-isolation plate disposed inside the case and over the light source.

4. The light source module as recited in claim 3, wherein the heat-isolation plate and the airflow guider are integrally formed.

5. The light source module as recited in claim 3, wherein the heat-isolation plate is made of metal.

6. The light source module as recited in claim 1, wherein the airflow guider is made of metal.

7. A projection display, comprising:

a case having an airflow outlet and a projection opening thereon;

a light source disposed in the case for providing a light beam;

an imaging unit disposed in the case;

a projection lens disposed at the projection opening of the case, wherein the light beam is projected outwards from the projection opening after passing through the imaging unit and the projection lens;

a first air-circulation device disposed in the case, the first air-circulation device and the airflow outlet being located at opposite two sides of the light source, wherein the first air-circulation device is located at the front of the light source and blows a first airflow towards the inside of the light source;

a second air-circulation device disposed in the case, the second air-circulation device and the first air-circulation device being located at a same side of the light source, wherein the second air-circulation device is located at a side of the light source and blows a second airflow towards the periphery of the light source; and an airflow guider disposed in the case, comprising a first stream-guiding part and a second stream-guiding part connected to said first stream-guiding part, the first stream-guiding part and the airflow outlet being located at a same side of the light source, the second stream-guiding part being over the light source, wherein the first airflow blown into the inside of the light source leaves the inside of the light source at the front of the light source and then flows towards the first stream-guiding part, and then the first airflow is guided by the second stream-guiding part to flow from the front of the light source towards the second air-circulation device, such that the first airflow with a first temperature mixes up with the second airflow with a second temperature, wherein the first temperature is higher than the second temperature, and the first airflow and the second airflow finally exit from the airflow outlet with a moderate temperature.

8. The projection display as recited in claim 7, wherein the first air-circulation device is a blower and the second air-circulation device is an axial fan.

9. The projection display as recited in claim 7, further comprising a heat-isolation plate disposed inside the case and over the light source.

10. The projection display as recited in claim 9, wherein the heat-isolation plate and the airflow guider are integrally formed.

11. The projection display as recited in claim 9, wherein the heat-isolation plate is made of metal.

12. The projection display as recited in claim 7, wherein the airflow guider is made of metal.

* * * * *